Patented Nov. 4, 1941

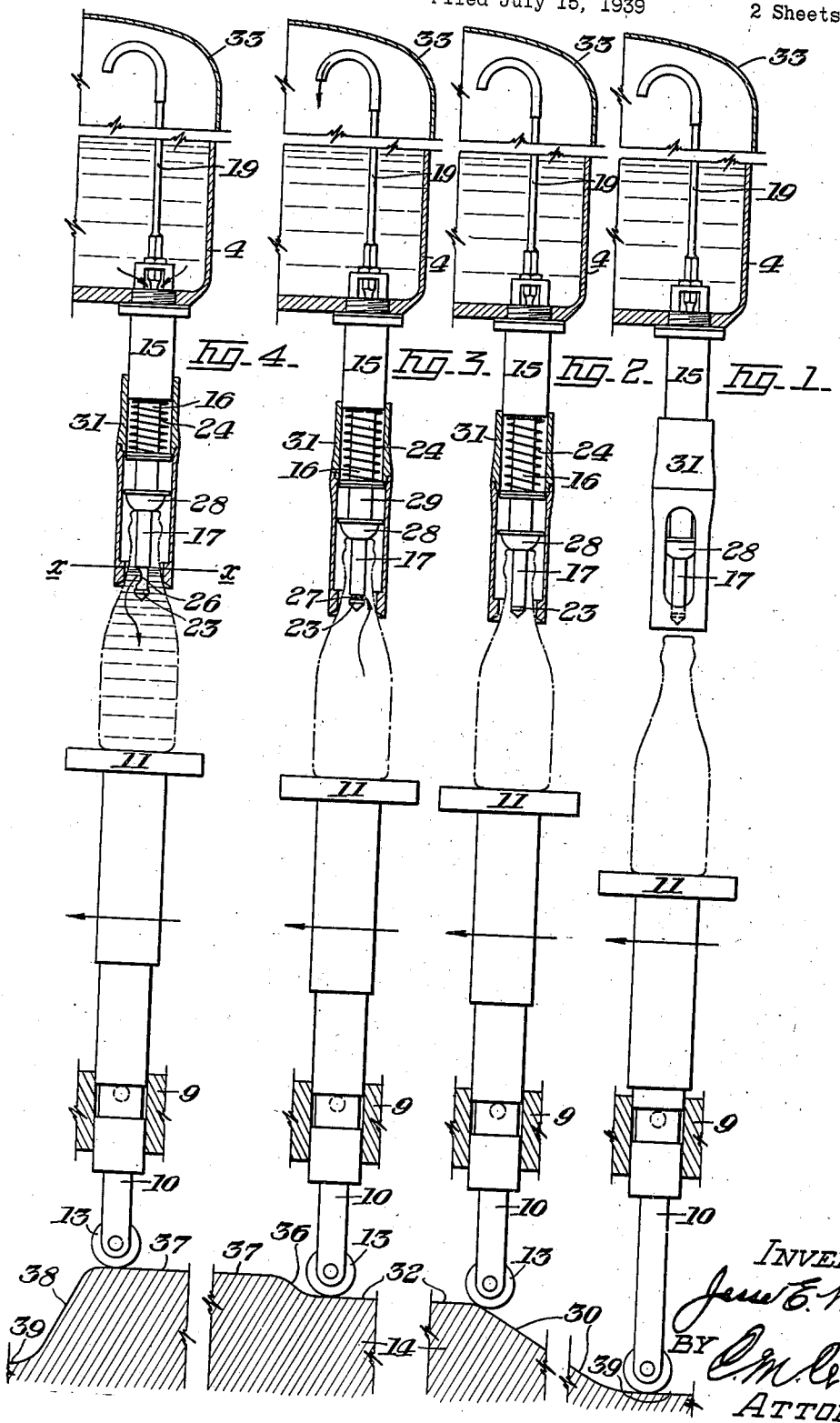

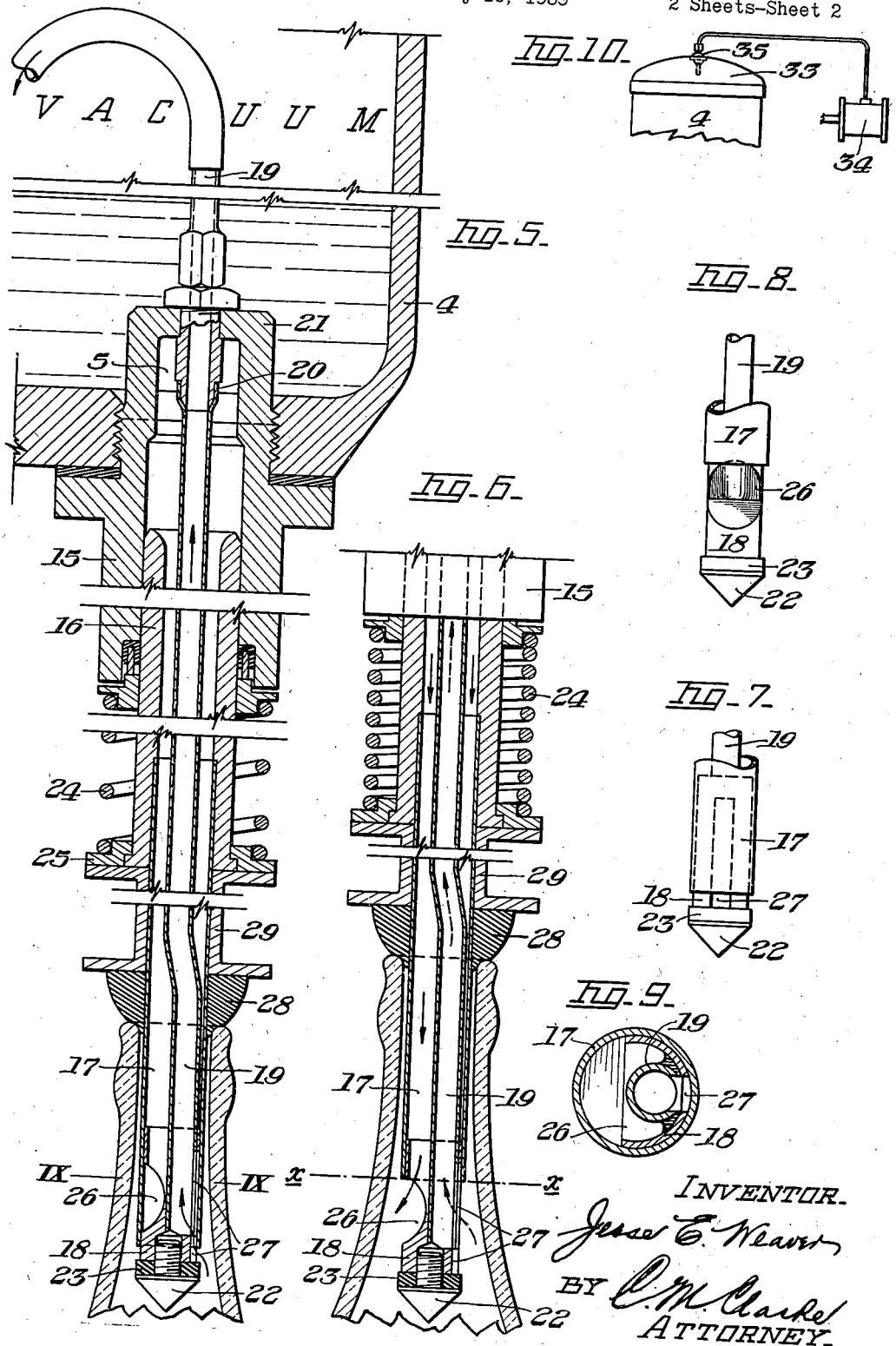

2,261,705

UNITED STATES PATENT OFFICE 2,261,705

FILLING MACHINE FOR CONTAINERS

Jesse E. Weaver, Carnegie, Pa., assignor to Horix Manufacturing Company, Pittsburgh, Pa., a corporation of Pennsylvania Application July 15, 1939, Serial No. 284,654

3 Claims. (Cl. 226—98)

This invention relates to improvements in filling machines and the method of filling containers.

In the filling of containers with liquids and the like, it is common practice to employ what are known as filling valves or heads operable upon engagement by a container to vent and fill the latter from a suitable supply source. At the end of the filling cycle, some of the liquid enters the vent in the filling valve, necessitating cleaning the vent prior to the next filling operation.

Various means have been employed heretofore for cleaning the vent, but generally, such prior devices and methods have embodied separate apparatus in addition to the filling valve or head, including separate pressure means for cleaning the vent and involving additional structure materially contributing to the cost of the filling machine and its operation.

I have discovered that the filling and vent cleaning operations may be advantageously carried out in a closed pressure system, utilizing the filling valve or head and the operation thereof by the engaged container, whereby the desired results may be obtained simply and economically.

By means of my improved filling machine and method, the vent is positively cleaned without waste of the liquid and without soiling the container. Also, the cleaning of the vent is accomplished without any undue delay or extension of the filling cycle of the container and machine.

In the practice of my invention, the liquid supply reservoir is maintained under either sub-atmospheric or super-atmospheric pressure, and upon establishing communication with a container at atmospheric pressure through the filling valve, a flow of air is induced between the liquid reservoir and container through the vent in the filling valve, whereby to positively scavenge the vent, by displacement of its contained liquid to the reservoir or to the container.

As the vent is cleaned, the pressure of the container and reservoir becomes equalized, and the liquid is then delivered to the container under the static head of the supply in said reservoir.

By carrying out the filling operation under sub-atmospheric pressure or under a slight vacuum, any leakage normally occasioned by wear of the parts is prevented due to the fact that the system will draw in air rather than discharge liquid.

This provision against leakage is highly advantageous, particularly in connection with the filling of containers with expensive liquids or those subject to tax, such as liquors, etc., where leakage is costly and must be prevented.

The advantages and operation of my invention may be more readily understood from the following description, taken in connection with the accompanying drawings, wherein:

Fig. 1 is a diagrammatic view, partly in section, of an embodiment of my invention, showing a container in position at the start of the filling cycle;

Fig. 2 is a similar view, showing the initial engagement of the container and filling valve;

Fig. 3 is a similar view, showing the initial vent opening step;

Fig. 4 is a similar view, showing the container completely filled;

Fig. 5 is an enlarged sectional view through the reservoir, filling valve, and container in the position of Fig. 3;

Fig. 6 is a view of a portion of Fig. 5 showing the parts in the position of Fig. 4;

Fig. 7 is a partial detail elevational view of the tip of the filling valve in the position of Fig. 5;

Fig. 8 is a similar view, showing the opposite side of the filling valve tip in the position of Fig. 6;

Fig. 9 is an enlarged cross-section taken on the line IX—IX of Fig. 5; and

Fig. 10 is a diagrammatic view showing a means for applying a pressure to or of reducing pressure in the liquid reservoir.

In the practice of my invention, I prefer to employ what is commonly known as a rotary filling machine, wherein a liquid reservoir or tank having an annular series of filling valves, together with a series of container supports, rotate about a common vertical axis. The container supports travel over a stationary cam track whereby the supports are successively raised and lowered to engage and disengage the containers with and from the filling valves or heads. Such a machine is shown and described in the patent to Haller No. 1,425,960 of August 15, 1922.

I have illustrated a single filling valve or head with its cooperating container support and cam track for filling a container from an elevated reservoir or tank, it being understood that a plurality of valves and supports may be employed and that the same, together with the reservoir, are rotatable in relation to the cam track as shown in said patent.

It will be understood also that the invention is not limited to a rotary type filling machine but may be utilized with a non-rotatable machine for raising and lowering containers, as in a straight line type.

In the drawings, 4 designates an elevated rotatable tank or supply reservoir for the liquid being dispensed in the filling machine, which machine generally provides a rotatable annular series of filling stations beneath said reservoir. At each filling station is provided a guide bearing 9 for a vertically movable rod 10 having a container support or table 11 at the upper end thereof. The lower end of each rod 10 is provided with a roller 13 cooperating with a stationary annular cam track 14 for automatically raising and lowering the container supports as is customary in machines of the character stated.

At each filling station, the bottom of the reservoir 4 is provided with an outlet opening in which is mounted a depending filling valve or head including sleeve 15 secured in said opening and having an inner telescoping sleeve 16. (See Figs. 5 and 6.)

Secured in and depending from the inner sleeve 16 is a filling tube 17, whereby both are movable together, the lower end of which tube 17 slidably embraces and cooperates with a stationary telescoping plug 18 forming a sleeve valve device functioning as hereinafter set forth. Said plug 18 is secured to the lower end of an air vent tube 19 extending longitudinally within the sleeves 15 and 16 and filling tube 17, the vent tube being fixed at 20 to a supporting open side yoke structure 21 at the upper end of sleeve 15.

22 designates a terminal coniform abutment or tip on the plug 18 having a sealing washer 23 engageable by the lower telescoping end of the filling tube 17 for closing the latter. An expansion spring 24 extending between the lower end of sleeve 15 and a provided abutment 25 on the lower end of sleeve 16, normally closes the filling tube 17 on the seal 23, as in Figs. 1 and 2.

The valve plug 18 is formed with a side outlet opening 26 communicating with the interior of the filling tube 17 and controlled by movement of the latter for permitting and preventing a flow of liquid from the reservoir through the filling valve unit or head.

Said plug is likewise provided with a longitudinally extending external slot or port 27 spaced from the outlet opening 26. The port 27 communicates directly with the vent tube 19 and is controlled by movement of the filling tube terminal for permitting and preventing external communication with the lower end of the said vent tube.

An annular sealing abutment 28 of rubber or the like is carried by the filling tube 17 for engagement by a container being filled, such as the bottle illustrated, the seal 28 being spaced from the terminal end of the filling tube in accordance with the height of the desired fill in the container. A suitable spacer sleeve 29 may be employed beneath the lower end of sleeve 16 for regulating said fill height and serving as an abutment for transmitting the upward pressure exerted by the container on the seal 28 and sleeve 29, directly to the telescoping sleeve 16, against reacting pressure of spring 24.

From the foregoing it will readily be seen that upon applying an upward pressure, as by elevating a container against the sealing abutment 28, the sleeve 16 may be raised, thereby elevating the filling tube to first open the vent port 27 as in Fig. 5, and finally after a rest period, to open the filling opening 26, as in Fig. 6.

In this connection, attention is directed to the fact that the venting port 27 of plug 18 extends downwardly to the sealing washer 23, whereas the outlet opening 26 is substantially above and spaced from such washer. Hence, the port 27 immediately opens with first partial upward movement of the filling tube terminal 17, and the opening of outlet 26 is temporarily delayed, which construction and operation is utilized as hereinafter more fully described.

In the practice of my invention, a container or bottle is placed upon the support 11, and through rotation of the latter with the filling valve and reservoir in relation to the cam track 14 as described, the support and container are elevated toward the filling valve by the travel of roller 13 up an initial cam rise 30, as in Figs. 1 and 2. 31 designates a guide carried by the filling valve for embracing the container or bottle for assisting in alining the filling tube 17 with the container for entrance therein as in Fig. 2.

The cam rise 30 is so proportioned that just before roller 13 reaches the top thereof, as in Fig. 2, the bottle engages the sealing abutment 28 with sufficient pressure to begin upward lift of the filling tube 17.

As the roller engages the level of the rest period step 32 of the cam track, the filling tube 17 has been only elevated sufficiently to open the venting port 27 as in Figs. 3, 5 and 7, whereby the interior of the container is put in communication with the reservoir 4 through the vent tube 19, the latter extending upwardly in the reservoir above the liquid level.

The reservoir 4 is hermetically sealed, as by cover 33, and a controlled abnormal or subnormal pressure is maintained therein in any suitable manner, as for example by means of a pressure or suction pump 34 having a suitable swivel connection 35 with the rotatable reservoir, as indicated diagrammatically in Fig. 10.

In the preferred practice of my invention, I utilize the element 34 as a vacuum pump for maintaining the reservoir and system under a slight vacuum, as for example, of from four to ten inches gauge. If it is desired to substitute a slight pressure, element 34 may be a force pump.

With the system maintained at the desired vacuum pressure, upon the vent opening between the reservoir and container as described, the atmospheric air in the container will flow to the reservoir, displacing any contained liquid present in the vent tube 19 and discharging the same into the reservoir, as indicated by the arrows in Fig. 5.

While the container and filling valve are in the venting position of step 32 of cam 14, the vent is positively and quickly cleaned, and the reservoir and container will attain an equal pressure.

As the rotation of the machine continues, the roller 13 moves up a second rise 36 to the filling step 37, the elevation of which will raise the filling tube 17 to uncover the outlet opening 26, whereby liquid flows from the reservoir 4 through side openings 5 into sleeves 15 and 16 and said filling tube 17 into the container under the static head of said liquid, as indicated by the solid arrows in Figs. 4 and 6.

During said filling operation, the venting port 27 remains open for corresponding flow and displacement of air from the container to the reservoir, as indicated by the dotted arrows of Fig. 6.

As the liquid in the container reaches the level $x$—$x$ of the lower end of the filling tube 17, the flow ceases due to the closing of the venting port 27 by the liquid, and the container is then lowered with accompanying closing of the filling valve, by the gravitation of the roller 13 and container support 11 down the fall 38 of the cam track 14 to the lowermost or base surface 39 of said cam track, assisted by spring 24.

It will be understood that a similar filling cycle is contemplated under a super-atmospheric pressure, during which the vent cleaning and filling operations are accompanied in a similar manner, except that due to the pressure in the reservoir being greater than the original atmospheric pressure in the container, the liquid displaced from the vent tube will enter the bottle instead of the reservoir as under the vacuum practice. Upon equalization of the pressure in container and reservoir, the filling takes place as before.

However, the vacuum method is preferred, particularly due to the prevention of leakage. Since in such case the system is under a sub-atmospheric pressure, any opening occurring in the filling valve due to wear or accident, will cause air to be drawn into the system without leakage of the liquid being handled.

I have provided an improved mechanism and method of filling liquid containers which is extremely simple and efficient, and which may be practiced with economy.

Various changes and modifications are contemplated within the scope of the following claims.

I claim:

1. In a filling machine, a closed liquid reservoir, a stationary vent tube having a terminal valve plug provided with a liquid outlet opening and an air vent port, a filling conduit provided with a terminal valve sleeve covering said plug and its liquid outlet and air vent port adapted to be positioned in a container, means for sealing the container, the vent tube connecting said vent port with the reservoir above the liquid level therein, means maintaining an air pressure in the reservoir in an amount providing a pressure differential with the initial air pressure in the container, means consisting of a double step cam and intervening rest period surface for actuating the filling conduit to initially open the vent port for air displacement between the container and reservoir through the vent tube, thereby equalizing the air pressures in the container and reservoir and cleaning the vent tube, said conduit-actuating means then maintaining the vent tube open and the liquid outlet opening closed during a rest period, and subsequently opening the liquid outlet while maintaining the vent tube open permitting a flow of liquid to the container under the static head of the liquid in said reservoir.

2. In a filling machine, a closed liquid reservoir, means for maintaining an air pressure condition therein, a filling valve and a movable opening and closing filling conduit therefor in circulation relation with the reservoir, said valve having a liquid outlet and an air vent port adapted to be positioned in a container, means for sealing the container, a vent tube connecting said vent port with the reservoir above the liquid level therein, said movable filling conduit having a terminal sleeve normally closing the liquid outlet and vent port, and a pair of separate spaced apart successively acting cam means for actuating the movable conduit through an intervening container to first open the vent port with a following timed delay and subsequently open the liquid outlet while maintaining the vent port open.

3. In a filling machine, a closed liquid reservoir, means for maintaining an air pressure condition therein, a filling valve and a movable opening and closing filling conduit therefor for connecting the reservoir with a container, said valve having a liquid outlet and an air vent port adapted to be entered in the container, means for sealing the container, a vent tube connecting said vent port with the reservoir above the liquid level therein, said movable filling conduit having a terminal sleeve normally closing the valve outlet and vent port, and a stepped cam for progressively actuating the movable conduit, said cam including a step actuating the movable conduit to open the air vent port only, a rest period step, and a higher step for subsequently opening the liquid outlet while maintaining the vent port increasingly open.

JESSE E. WEAVER.